United States Patent [19]

Chase et al.

[11] Patent Number: 5,529,319
[45] Date of Patent: Jun. 25, 1996

[54] V-NOTCH SEAL FOR NON-FLOODED ZONE OF DISC FILTER VALVE

[75] Inventors: Calvin C. Chase, Dunstable; Frank J. Merchel, III, Salem, both of Mass.

[73] Assignee: Ingersoll-Rand Company, Woodcliff Lake, N.J.

[21] Appl. No.: 364,328

[22] Filed: Dec. 27, 1994

[51] Int. Cl.$^6$ ............ F16J 15/16; B01D 33/067
[52] U.S. Cl. ............ 277/128; 277/144; 277/171; 277/229; 210/404; 210/406
[58] Field of Search ............ 277/96.1, 128, 277/143, 144, 145, 192, 84, 229, 170, 171; 210/402, 403, 404, 406, 395, 398; 432/115

[56] References Cited

U.S. PATENT DOCUMENTS

| | | | |
|---|---|---|---|
| 2,535,634 | 12/1950 | Hubbard | 277/229 |
| 2,767,768 | 10/1956 | Jelinek | 277/229 |
| 3,409,139 | 11/1968 | Jackson et al. | 210/404 |
| 4,534,571 | 8/1985 | Tittes et al. | 277/128 |
| 4,821,536 | 4/1989 | Bardsley | 210/398 |
| 5,194,153 | 3/1993 | Bardsley | 210/406 |
| 5,263,724 | 11/1993 | Hansen et al. | 277/96.1 |

FOREIGN PATENT DOCUMENTS

| | | | |
|---|---|---|---|
| 311944 | 6/1919 | Germany | 277/144 |
| 1147198 | 4/1963 | Germany | 277/171 |
| 2923600 | 1/1980 | Germany | 277/96.1 |

*Primary Examiner*—Scott W. Cummings
*Attorney, Agent, or Firm*—Walter C. Vliet

[57] ABSTRACT

A circumferential seal for a disc filter valve to rotary collection pipe is formed by a radially compliant circumferentially restrained and tensioned seal disposed in a split "V" notch formed in a non-flooded zone between the stationary valve plate and the rotating collection pipe.

11 Claims, 2 Drawing Sheets

5,529,319

V-NOTCH SEAL FOR NON-FLOODED ZONE OF DISC FILTER VALVE

BACKGROUND OF THE INVENTION

This invention relates generally to seals and more particularly to a seal for a rotary collection core of a disc filter or the like. In the prior art, the collection channels, within the rotating core pipe, conduct liquid filtrate from submerged sectors of the disc filter and bypass air from the emerged sectors to a separation valve plate. Typically, the separation valve plate is a disc like structure having arcuate cutouts which permit the collected filtrate to drain either to an atmospheric drain or a vacuum drain. Vacuum is typically produced by barometric drop legs exiting a vacuum box in which the separation valve is placed.

Typically, the core to vacuum box seal is accomplished by a so-called deckle ring seal between a flange ring on the vacuum box and a seal ring on the core. Since both surfaces of the seal are circumferential, the deckle ring type seal normally does an adequate job of sealing the rotating core to the stationary vacuum box. The sealing surface between the core and the valve plate, however, are end to face which is sensitive to wear and axial movement during rotation. Excessive gaps between the end of the core and the valve plate permits substantial quantities of air to be drawn into the vacuum box thereby reducing the vacuum efficiency created by the barometric legs.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention this is accomplished by providing a seal for a disc filter valve comprising a first circumferential beveled seal ring mounted for rotation with a filter collection pipe; a complementary circumferential beveled seal ring mounted on a valve face to form a radially outward facing "V" notch in combination with the first seal ring; and a partial circumferential seal disposed in tension in the "V" notch.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
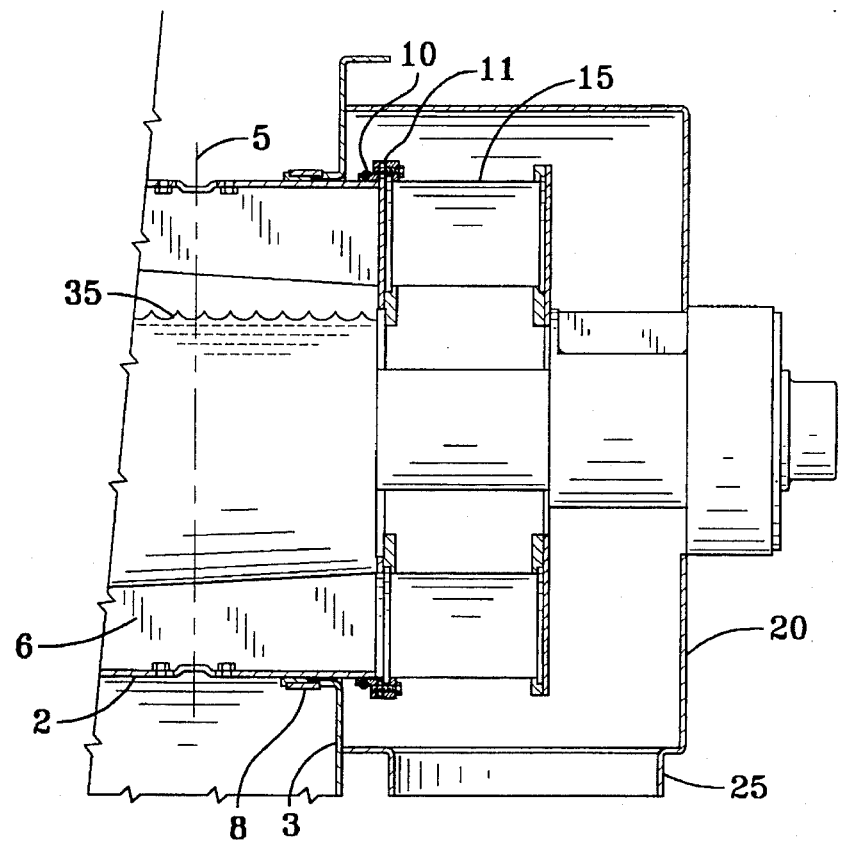
FIG. 1 shows a cross section of a portion of a disc filter core distribution valve and vacuum box showing the location of the seal according to the present invention.

FIG. 1 shows a cross section of the collection end of a disc filter according to the present invention. In a typical disc filter application, liquid and fibrous material are introduced into a vat 3. The fibrous material is collected on rotating filter elements 5 which pass through the liquid. As each filter element leaf submerges in the liquid, a fibrous mat begins to form on the surface of the leaf and an amount of liquid passes into the leaf and ultimately into collection channels 6. The initial formation of the fiber mat takes place under atmospheric conditions to assist in mat formation. Subsequently, vacuum is applied to the submerged leafs through the collection channels to increase the fiber mat formation and assist in its adherence to the leaf as the leaf exits the liquid level in the vat. The fiber mats are later stripped from the leafs in continued rotation. This process is well known in the rotating disc filter art.

The liquid collected in the process is transported axially along the core of the filter in segmented cores 2 which transfer the collected liquid during each phase of the process to the end of the segmented core where its flow is controlled by a face valve or seal plate 11. The seal plate 11 prevents vacuum from being applied to the segmented core during the atmospheric portions of collection as previously described. Accurate cutouts 19 in the valve or seal plate 11 permit vacuum to be applied to the segmented cores 2 and ultimately the filter elements 5 and also allow the collected liquid to flow into the vacuum box 20 as indicated in FIG. 1.

The liquid flows into the valve body 15 where it may be separated into clear or cloudy components if desired. The collected liquid enters the vacuum box and falls down through a barometric leg 25 which creates the vacuum in the vacuum box as is well known in the industry. It should be appreciated by one skilled in the art that as long as the collection channels 6 are filled with liquid, a minimum amount of air will escape into the vacuum box through any space between the collection channel 6 and the seal plate 11. Conversely, any air in the collection chambers will be tended to enter the vacuum box. The amount of air entering the vacuum box can be quite significant due to axial runout of the filter or poor or worn seal surfaces between the segmented core and the seal plate 11.

Figure 2:
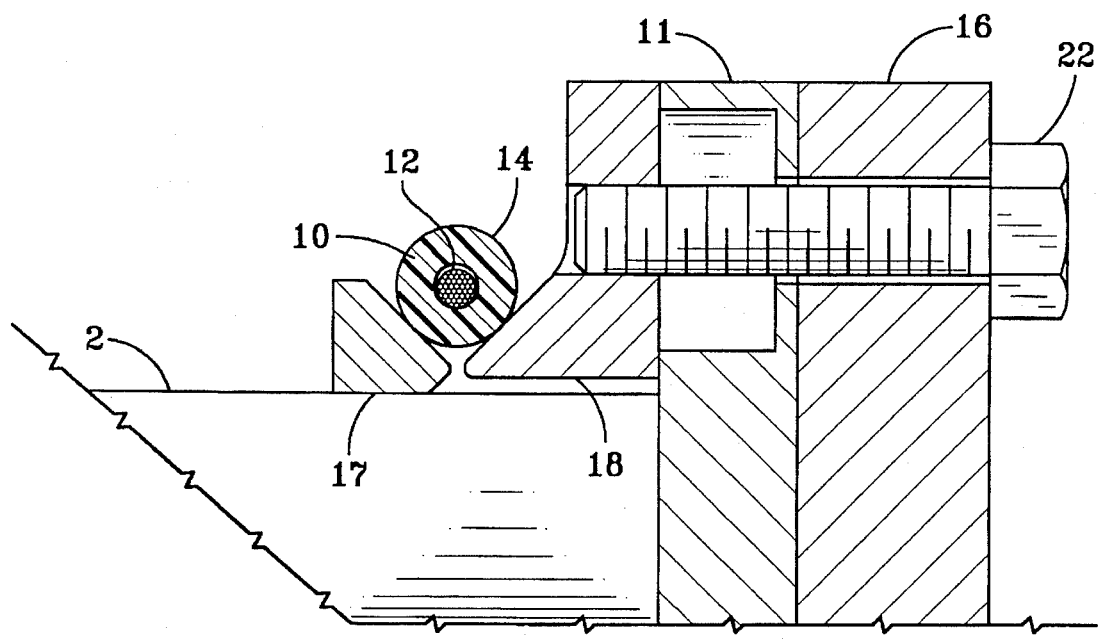
FIG. 2 is a cross section of a detail of the seal according to the present invention.

In order to prevent the air bypass, a seal according to the present invention has been provided, as shown in FIG. 2. As shown in cross section, a circumferential beveled seal ring 17 is attached to the rotating segmented core 2 by, for example, welding or the like. A complimentary beveled face seal ring 18 is attached to the seal plate 11 by means of, for example, a bolt 22 through a flange 16 of the valve body. Complimentary beveled surface of the seal ring 17 and face seal ring 18 form a "V" notch sealing surface of approximately 90 degrees open radially outward from the segmented core 2.

Figure 3:
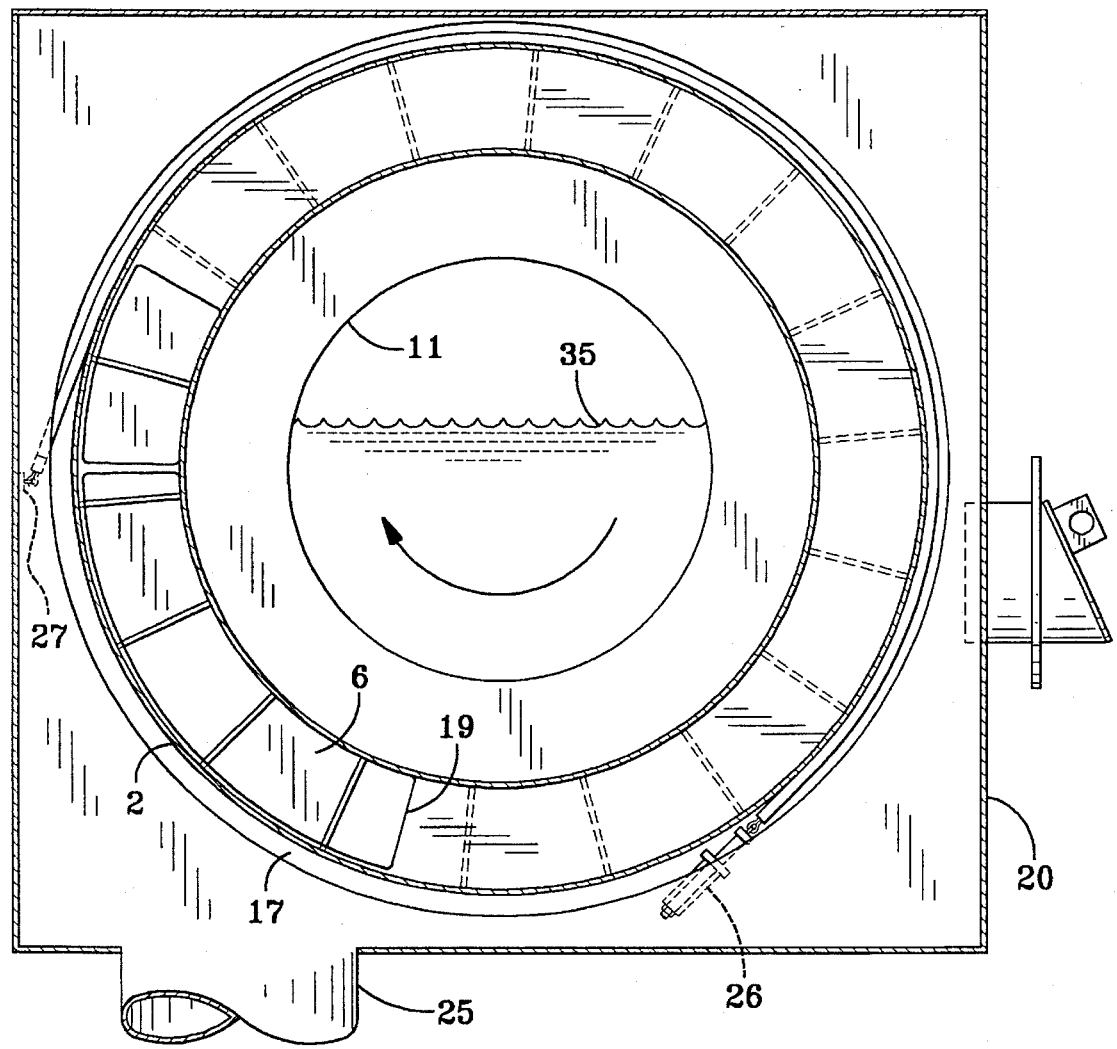
FIG. 3 is an end view of a seal according to the present invention taken through the seal and viewing to the left as shown in FIG. 1.

Disposed within the formed "V" notch is a hollow core "O" ring 10 having a wire reinforcing element 12 running through the hollow core. The purpose of the wire rope or tension cable 12 is to position the "O" ring 10 within the "V" notch and retain it there both radially and circumferentially during rotation. To minimize friction and improve the wear characteristics of the otherwise resilient hollow core "O" ring 10, an outer sheath 14 of wear resistant material such as, for example, Teflon® may be provided. Referring to FIG. 3, the "O" ring 10 is shown disposed about the circumference of the segmented core 2 through an arc extending approximately 210 degrees from the seal anchor 27 to a tension spring or seal tensioner 26. This is the primary area in which air might be expected to bypass the seal were it not in place.

It should be appreciated that the seal stretches from the seal anchor in the direction of rotation to the seal tensioner 26. It should also be appreciated that the wire rope provides a radially inwardly force to hold the seal in place and further prevents the elongation of the otherwise resilient seal due to friction forces created between the "O" ring and the beveled surfaces during rotation.

The tension spring maintains a constant force on the seal during rotation and accommodates any difference in required seal length due to axial runout of the filter core. It should also be appreciated that the circumferential location of the seal is dependent on the requirements of the disc filter, the location of liquid levels, and the nature of the filtrate and fiber involved in the operation.

Having described our invention in terms of a preferred embodiment, we do not wish to be limited in the scope of our invention except as claimed.

What is claimed is:

1. A vacuum seal for a non-flooded zone of a rotating filter collection pipe to a valve face butt joint comprising:

a first circumferential beveled seal ring mounted for rotation with said filter collection pipe;

a complementary circumferential beveled seal ring mounted on said valve face to form a radially outward facing "V" notch in combination with said first seal ring; and a partial circumferential seal disposed in the non-flooded zone in tension in said "V" notch.

2. A seal for a rotating filter pipe to face butt joint according to claim 1 wherein:

said first circumferential beveled seal ring and said complementary circumferential beveled seal ring are constructed of a relatively hard wear resisting material.

3. A seal for a rotating filter pipe to face butt joint according to claim 1 wherein:

said "V" notch forms an approximately 90 degree notch.

4. A seal for a rotating filter pipe to face butt joint according to claim 1 wherein:

said filter collection pipe comprises a central collection pipe for a disc filter and said valve face comprises a face plate of a filtrate collection valve.

5. A seal for a rotating filter pipe to face butt joint according to claim 4 wherein:

said filtrate collection valve is a vacuum filtrate valve disposed within a vacuum box.

6. A seal for a rotating filter pipe to face butt joint according to claim 1 wherein:

said partial circumferential seal disposed in tension in said "V" notch further comprises a continuous seal for at least a portion of said circumference.

7. A seal for a rotating filter pipe to face butt joint according to claim 1 wherein:

said partial circumferential seal disposed in tension in said "V" notch further comprises an elongated tubular member of compliant resilient material reinforced to minimize longitudinal stretch.

8. A seal for a rotating filter pipe to face butt joint according to claim 1 wherein:

said partial circumferential seal disposed in tension in said "V" notch further comprises an elongated tubular member having a resilient hollow core covered by a friction reducing wear resisting cover and being provided with a tension cable within said hollow core for positioning said seal and assuring compliance of said seal within said "V" notch.

9. A seal for a rotating filter pipe to face butt joint according to claim 8 wherein:

said tension cable is secured at one upstream end in the direction of rotation and spring loaded at one downstream end.

10. A seal for a rotating filter pipe to face butt joint according to claim 8 wherein:

said hollow core is comprised of a soft rubber material and said wear resisting cover is comprised of a polytetrafluoroethylene material.

11. A seal for a rotating filter pipe to face butt joint according to claim 6 wherein:

said partial circumferential seal disposed in tension in said "V" notch further comprises a continuous seal throughout the upper air bypass zone of said disc filter collection pipe.

* * * * *